United States Patent [19]

Laurenz

[11] 4,260,137
[45] Apr. 7, 1981

[54] ELECTRIC GATE WITH SEMI-PROTECTED ELECTRODE

[76] Inventor: Frank R. Laurenz, P.O. Box 359, Eagle Butte, S. Dak. 57625

[21] Appl. No.: 23,747

[22] Filed: Mar. 26, 1979

[51] Int. Cl.³ .............................................. A01K 3/00
[52] U.S. Cl. ......................................... 256/10; 109/35
[58] Field of Search ...................... 256/10, 73; 49/59; 119/155; 109/35

[56] References Cited

U.S. PATENT DOCUMENTS

| 967,754 | 8/1910 | Gifford | 256/73 UX |
|---|---|---|---|
| 2,023,835 | 12/1935 | Heiken | 256/10 |
| 2,376,630 | 5/1945 | Stentz | 256/10 X |
| 2,731,744 | 1/1956 | Schnell | 49/59 |
| 3,208,433 | 9/1965 | McDermott | 119/155 |
| 3,716,032 | 2/1973 | Laurenz | 119/155 |
| 3,747,897 | 7/1973 | Conley | 256/10 |

*Primary Examiner*—Andrew V. Kundrat
*Attorney, Agent, or Firm*—Larson, Taylor and Hinds

[57] ABSTRACT

An electrode, connected to a fence charger or the like is secured across the bottom of a gate, fence or the like. A shield partially surrounds the electrode to prevent animals from contacting the electrode unless the animals attempt to put their heads under the gate or fence or attempt to crawl under the gate or fence.

14 Claims, 6 Drawing Figures

ELECTRIC GATE WITH SEMI-PROTECTED ELECTRODE

BACKGROUND OF THE INVENTION

This invention relates to new and useful improvements in electric fences, gates or the like, particularly fences or gates which are designed to be used to separate livestock in a crowded area.

Electric fences or gates are well known for their ability to separate livestock, but in a crowded area, a totally exposed electrode, as conventionally used, punishes indiscriminately and in crowded areas, animals will fear to enter that portion of the pen where the electrode is exposed.

This is important when designing an animal confinement system with an exposed scraper inasmuch as the animal will receive frequent and indiscriminate punishment so that they will not use the portion of the pen near the scraper where the exposed electrode is used.

However, under normal circumstances it is desirable to provide a semi-shielded electrode which will only operate to deter the animal if it places its head under the gate or fence or attempts to crawl under the gate or fence.

Prior art devices include U.S. Pat. Nos. 2,023,835, 2,376,630, 2,540,562, 2,711,037 and 3,747,897, but none of these teach the discriminate use of a deterrent electrode.

SUMMARY OF THE INVENTION

The present invention overcomes the disadvantages inherent with known prior art devices and in accordance with the invention there is provided an electric fence, gate or the like which includes a transverse lower side spaced above the floor, ground or the like, an ungrounded electrode spanning said lower side and being connectable to a source of electrical energy, and a partial shield on at least one side of said conductor and being spaced therefrom, thereby providing restricted access to said conductor from said one side.

Another advantage of the present invention is to provide a device of the character herewithin described in which the shield partially encloses both sides of the transversely extending electrode so that animals upon either side of the gate or fence may lie against gate or fence without contacting the electrode yet which will contact the electrode if they attempt to place their heads under the gate or attempt to crawl under the gate.

In other words, the main advantage of the present device is to provide a semi-protected electrode which administers only discriminate punishment and only if the animal attempts to put its head under or to crawl under the gate or fence. The animal may walk or stand or lie beside the electrode without receiving indiscriminate punishment so that the device is selective in its operation.

A further advantage of the present invention is that it is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE INVENTION

In the drawings like characters of reference indicate corresponding parts in the different figures.

DETAILED DESCRIPTION

Figure 1:
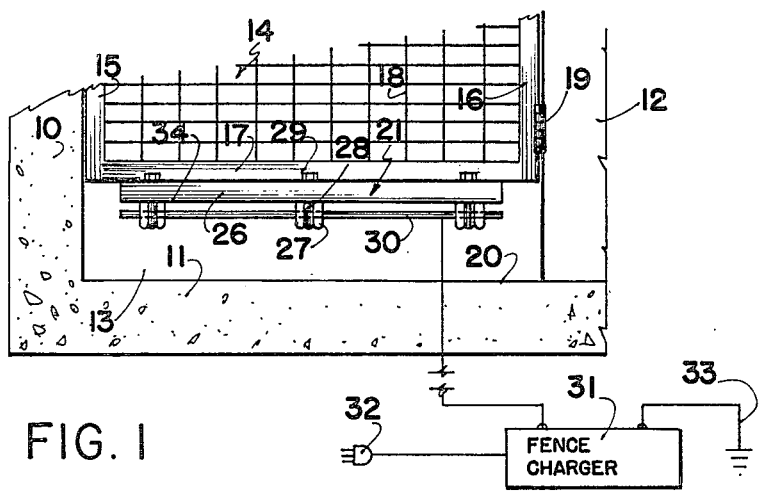
FIG. 1 is a fragmentary front elevation of a gate extending across an alley between the pen divider wall and the outside wall of an animal confinement system.

Before proceeding with the description of the invention, it should be appreciated that in the drawings, and in the subsequent description, the invention is described as being applied to a gate situated across an alley in an animal confinement system. However, it should be appreciated that the invention can readily be applied to any gate system wherein the bottom edge of the gate is spaced above the floor or ground or in any electrical fence environment.

In FIG. 1, reference character 10 illustrates the outside wall of an animal confinement system extending upwardly from one side of an alley floor 11 with the end 12 of a pen divider wall also extending upwardly from the floor 11 spaced from the outer wall 10 thus defining an alleyway 13 adapted for use with a manure scraping device (not illustrated).

A gate assembly collectively designated 14, which in this instance, is an alley gate, extends between the pen divider wall 12 and the outer wall 10 and divides the animal confinement system into two or more individual areas (not illustrated). The alley gate 14, in this embodiment, includes spaced and parallel vertical frame members 15 and 16, transverse base member 17 and wire mesh 18 spanning the frame. This gate may be hinged to the pen divider wall 12 by means of hinges 19 and latch means (not illustrated) may extend between the outer wall 10 and the vertical frame member 15.

It will be observed that the base frame member 17 is spaced from the ground surface 20 of the alleyway 13 for clean-out purposes and the device collectively designated 21 is secured to the lower frame member 17 and spans the width of the alleyway 13 in order to prevent animals from putting their heads under the gate assembly or crawling under the gate assembly.

The device 21, in this embodiment, consists of a semi-protected electrode assembly collectively designated 22 mounted to the underside of a semi-protecting mounting base plate or shield collectively designated 23 which in turn is secured to the lower frame member 17 by any convenient means such as bolts, welding or the like (not illustrated).

Figure 2:
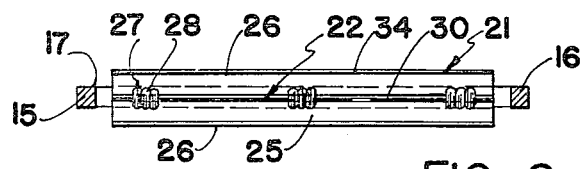
FIG. 2 is a bottom plan view of the gate with the invention attached thereto.
Figure 3:
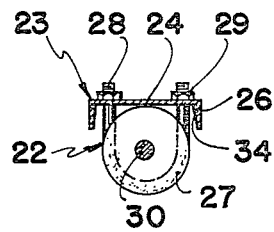
FIG. 3 is an end view of the preferred embodiment of the electrode assembly per se.

In the preferred embodiment shown in FIGS. 1, 2 and 3, the shield or electrode mounting base comprises a shallow channel member 24 having a horizontal web portion 25 and downwardly extending flange portions 26, one upon each edge of the web portion 25, so that it forms an inverted U configuration when secured to the lower frame member 17. Thimble type insulators 27 are secured at spaced intervals within the channel, by U- bolts 28 and nuts 29, with the U-bolts passing around the thimble shaped insulators 27 and passing through the web 25 so that the nuts engage the ends of the U-bolts upon the upper side of the web and upon each side of the lower frame member 17 at the gate.

A bare wire or rod conductor or electrode 30 is supported by the insulators in spaced and parallel relationship with the channel 23 and is operatively connected to a source of electrical energy such as a fence charger 31 which may include a plug 32 engageable with a conventional wall plug (not illustrated). This charger is grounded on one side as indicated by reference character 33 and the electrode 30 is ungrounded due to the fact that it is insulated by the insulators 27. Alternatively, a source of electrical energy such as a battery and step-up transformer (not illustrated) may be utilized.

It will be observed that the lower edges 34 of the flanges 26 are spaced slightly above the electrode 30 and that the flanges being spaced upon either side of the electrode, provide semi-protection or partial shielding of the electrode so that animals standing, walking or even lying against the gate, on either side thereof, will not contact the electrode but if they attempt to put their heads under the gate or to crawl under the gate, they will engage the electrode and receive an electric shock which discourages them from this action.

Figure 4:
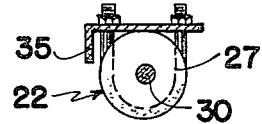
FIG. 4 is an alternative construction to FIG. 3.
Figure 5:
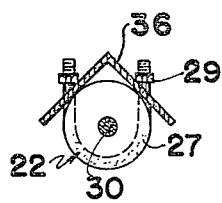
FIG. 5 shows an alternative construction to FIG. 3.
Figure 6:
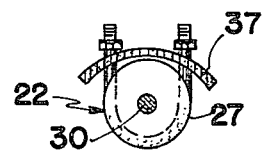
FIG. 6 shows yet another alternative construction to FIG. 3.

Although FIG. 3 shows the preferred embodiment of the shield 23, FIGS. 4, 5 and 6 show alternative embodiments. In FIG. 4, the shield is provided with a flange 35 on one side only, if the gate is merely for confinement purposes. The shield 36 in FIG. 5 is in the form of an inverted angle iron in a V-shaped configuration and in FIG. 6, the shield 37 is semi-circular in cross sectional configuration. However, in all cases, the lower edges of the shield are spaced above the electrode and are spaced either on one or both sides thereof as clearly shown.

Needless to say, the size of the electrode mounting base, the insulators and the electrode itself, can vary to accommodate different sized animals and to get the desired discriminate punishment.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an electric fence which includes a transverse lower side spaced above the floor, ground or the like, an ungrounded conductor electrode spanning said lower side between said lower side and the ground and being connectable to a source of electrical energy, and a partial shield on at least one side of said conductor and being spaced therefrom, thereby providing restricted access to said conductor from said one side, said partial shield extending downwardly from the lower side of said fence and with its lower edge terminating spaced above said electrode.

2. The fence according to claim 1 in which said shield is spaced from said electrode and extends the full length thereof.

3. The fence according to claim 1 in which said shield extends upon each side of said electrode thereby providing restricted access to said conductor from either side thereof.

4. The fence according to claim 2 in which said shield extends upon each side of said electrode thereby providing restricted access to said conductor from either side thereof.

5. A fence for livestock or the like which includes a lower transverse edge spaced from the ground or floor, an ungrounded electrode secured to said lower transverse edge in spaced and parallel relationship thereto between said edge and the ground and a partial shield on at least one side of said conductor and being spaced therefrom, thereby providing restricted access to said conductor from said one side.

6. The fence according to claim 5 in which said shield is spaced from said electrode and extends the full length thereof.

7. The fence according to claim 5 in which said shield extends upon each side of said electrode thereby providing restricted access to said conductor from either side thereof.

8. The fence according to claim 6 in which said shield extends upon each side of said electrode thereby providing restricted access to said conductor from either side thereof.

9. The fence according to claims 5, 6 or 7 in which the lower edge of said partial shield extends downwardly from the lower side of said fence and terminates spaced above said electrode.

10. The fence according to claim 8 in which the lower edge of said partial shield extends downwardly from the lower side of said fence and terminates spaced above said electrode.

11. In an electric fence, gate or the like which includes a transversely extending lower edge, an electrode, means mounting said electrode in insulating relationship to said gate, fence or the like in spaced and parallel relationship thereto between said lower edge and the ground, a source of electrical energy operatively connected to said electrode and a partial shield on at least one side of said electrode and being spaced therefrom thereby providing restricted access to said electrode from said one side, said partial shield extending downwardly from the lower edge of said fence and with its lower edge terminating spaced above said electrode.

12. The electric fence according to claim 11 in which said shield is spaced from said electrode and extends the full length thereof.

13. The electric fence according to claim 11 in which said shield extends upon each side of said electrode thereby providing resricted access to said conductor from either side thereof.

14. The electric fence according to claim 12 in which said shield extends upon each side of said electrode thereby providing restricted access to said conductor from either side thereof.

* * * * *